US008548838B1

(12) United States Patent
Ganesan

(10) Patent No.: US 8,548,838 B1
(45) Date of Patent: Oct. 1, 2013

(54) METHOD, SOFTWARE AND/OR PROCESS FOR OPTIMIZING THE DISTRIBUTION OF LABOR IN A MANUFACTURING ENVIRONMENT

(75) Inventor: Tel K. Ganesan, Farmington Hills, MI (US)

(73) Assignee: Kyyba, Inc., Farmington Hills, MI (US)

( * ) Notice: Subject to any disclaimer, the term of this patent is extended or adjusted under 35 U.S.C. 154(b) by 1538 days.

(21) Appl. No.: 11/526,351

(22) Filed: Sep. 25, 2006

Related U.S. Application Data

(60) Provisional application No. 60/721,405, filed on Sep. 28, 2005.

(51) Int. Cl.
*G06Q 10/00* (2012.01)
(52) U.S. Cl.
USPC .......................................... 705/7.13; 705/7.22
(58) Field of Classification Search
USPC .............................................................. 705/8
See application file for complete search history.

(56) References Cited

U.S. PATENT DOCUMENTS

| | | | | |
|---|---|---|---|---|
| 4,888,692 A * | 12/1989 | Gupta et al. | ..................... | 700/96 |
| 5,093,794 A * | 3/1992 | Howie et al. | ................... | 700/100 |
| 5,212,791 A * | 5/1993 | Damian et al. | ................... | 705/29 |
| 5,241,465 A * | 8/1993 | Oba et al. | .......................... | 705/8 |
| 5,406,476 A * | 4/1995 | Deziel et al. | ................. | 705/7.15 |
| 5,574,640 A * | 11/1996 | Sycara et al. | ................... | 700/99 |
| 5,623,404 A * | 4/1997 | Collins et al. | ..................... | 705/9 |
| 5,692,030 A * | 11/1997 | Teglovic et al. | ................ | 379/14 |
| 5,848,403 A * | 12/1998 | Gabriner et al. | ................ | 706/13 |
| 5,920,846 A * | 7/1999 | Storch et al. | ....................... | 705/7 |
| 5,993,041 A * | 11/1999 | Toba | ............................... | 700/99 |
| 6,578,005 B1 * | 6/2003 | Lesaint et al. | ..................... | 705/8 |
| 7,139,722 B2 * | 11/2006 | Perrella et al. | ............... | 705/7.19 |
| 7,593,712 B2 * | 9/2009 | Moton et al. | ................ | 455/404.2 |
| 7,693,735 B2 * | 4/2010 | Carmi et al. | ................. | 705/7.16 |
| 2002/0128850 A1 * | 9/2002 | Chen et al. | ......................... | 705/1 |
| 2003/0126103 A1 * | 7/2003 | Chen et al. | ...................... | 706/50 |
| 2004/0044554 A1 * | 3/2004 | Bull et al. | ......................... | 705/8 |

OTHER PUBLICATIONS

Robust and flexible scheduling with evolutionary computation psu. edu [PDF]MT Jensen-2001—Citeseer.*
AbouRizk, et al.; "Construction Simulation and Distribution Fitting in a Data Deficient Environment", (C) 1993 IEEE, pp. 493-499.*
"Task Analysis of Shift Change Activity in Aviation Maintenance Environment: Methods and Findings", X Jiang, R Master, K Kelkar . . . —Human Factors and . . . , 2002—hf.faa.gov.*
"Analysis of worker assignment policies on production line performance utilizing a multi-skilled workforce" TN McDonald—2004—scholar.lib.vt.edu.*

* cited by examiner

*Primary Examiner* — Jonathan G Sterrett
(74) *Attorney, Agent, or Firm* — Christopher P. Maiorana, PC

(57) ABSTRACT

A method for optimizing a workforce. The method includes the steps of: (A) querying a pool of workers to determine a first set of workers qualified to perform a particular task at a particular time, (B) querying the pool of workers to determine a second set of workers that are present to work at the particular time, (C) querying the pool of workers to determine a third set of workers that have not already been assigned a task at the particular time and (D) determining a fourth set of workers to perform the task at the particular time by selecting workers belonging to each of the first set, the second set, and the third set.

19 Claims, 4 Drawing Sheets

METHOD, SOFTWARE AND/OR PROCESS FOR OPTIMIZING THE DISTRIBUTION OF LABOR IN A MANUFACTURING ENVIRONMENT

This application claims the benefit of U.S. Provisional Application No. 60/721,405, filed Sep. 28, 2005, which is hereby incorporated by reference in its entirety.

FIELD OF THE INVENTION

The present invention relates to a method, software and/or process for allocating a workforce generally and, more particularly, to a method, software and/or process for optimizing the distribution of labor in a manufacturing environment. The present invention may be particularly useful for automotive companies, but may be used in other industries as well.

BACKGROUND OF THE INVENTION

In a conventional factory (or manufacturing) environment, a pool of workers, with skills matched to assigned tasks, is typically needed to run an assembly line. The assembly line needs all the workers present to begin. It is extremely inconvenient and costly when workers fail to arrive promptly (or at all) and available skills do not match the tasks. Conventional solutions to filling up a particular assembly line with the number of workers needed use various ad-hoc mechanisms that can be inefficient when viewed in the context of the entire work force.

It would be desirable to implement a method for optimizing a workforce that minimizes inefficiencies when assigning particular workers to a particular task on an assembly line.

SUMMARY OF THE INVENTION

The present invention concerns a method for optimizing a workforce. The method includes the steps of: (A) querying a pool of workers to determine a first set of workers qualified to perform a particular task at a particular time, (B) querying the pool of workers to determine a second set of workers that are present to work at the particular time, (C) querying the pool of workers to determine a third set of workers that have not already been assigned a task at the particular time and (D) determining a fourth set of workers to perform the task at the particular time by selecting workers belonging to each of the first set, the second set, and the third set.

The objects, features and advantages of the present invention include providing a method, software and/or process for optimizing the distribution of labor in a manufacturing environment that may (i) reduce the size of a "temporary" pool of operators, (ii) improve product quality, (iii) produce fewer defects, (iv) reduce repair/rework, scrap and start-up loss, (v) improve pilot and production readiness, (vi) improve line supervisor efficiency, (vii) facilitate more effective management of operators, (viii) provide efficient identification of areas for improvement and training, (ix) strengthen team morale, (x) improve operations flexibility, (xi) accommodate future change and/or (xii) facilitate proactive and improved training.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
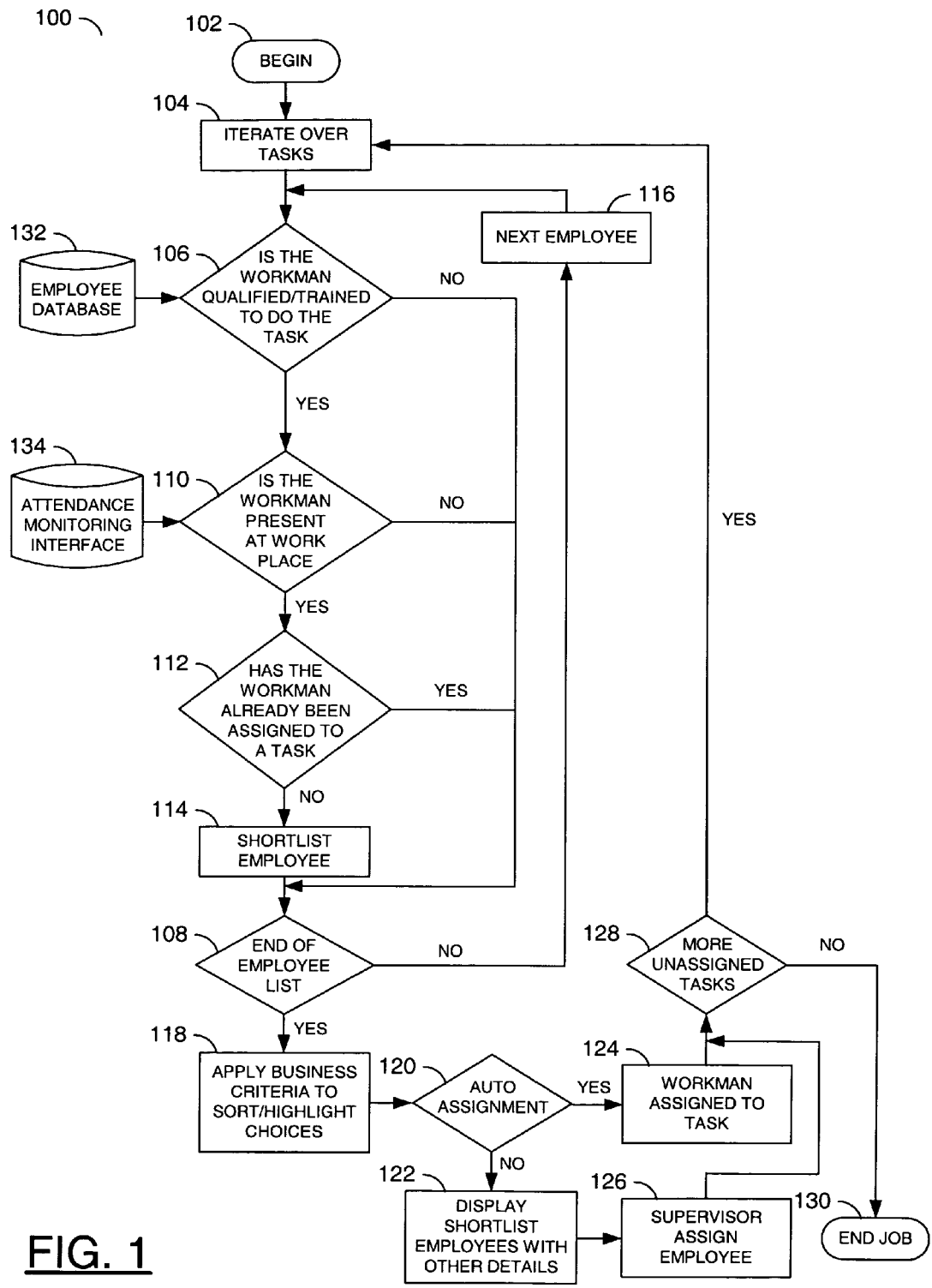
FIG. 1 is a flow diagram illustrating a process in accordance with the present invention.

The present invention generally provides an apparatus, method, process and/or software application for optimizing a workforce. The present invention may query a pool of workers to determine which workers are qualified to perform a particular task. Next, a query may be made to determine which workers are present (e.g., physically at the manufacturing facility) at a particular time. Next, a query may be made of the pool of workers to determine which workers have not already been assigned a task at a particular time.

By comparing the three queries, a set of workers for a particular task may be determined. For example, when a worker who is present is not qualified, the worker is generally not selected for the particular task. Similarly, when a worker is qualified and present, but has already been assigned another task, the worker generally is not assigned to a new task. By implementing the various queries in real time, the final step of determining the workers for a particular task may be made efficiently and quickly. By making the queries in real time, the step of determining the actual pool of workers for a particular line may be made so that a particular assembly line does not incur additional down time related solely to the process of selecting workers.

The various querying steps may be implemented in a variety of ways. For example, when a particular worker is delayed in arriving to the work site, a system may be implemented to allow that worker to call in ahead of time and estimate their time of arrival. Such a call may be implemented with a simple cellular telephone, a pager, a global positioning system (GPS) device, e-mail or other proprietary and/or non-proprietary systems for checking in. In the case of a GPS device, a system may be implemented to automatically determine an estimated time of arrival for the worker. In the case of a simple call-in using a cellular telephone, the worker may provide the estimated time of arrival.

When a number of lines need to be filled and operated at the same time, the present invention may analyze all of the lines to determine whether a delay in the start of one or more lines would be acceptable. For example, one line may be delayed if the delay decreases the overall delay in starting all of the lines. For example, it may be desirable to delay the start of a first line by two minutes, if that allows 2 or 3 additional lines to start 2 minutes earlier. In such an implementation, the total delay time of all the lines taken together is reduced.

The step of determining a set of qualified workers to perform a particular task may be implemented as a multi-tiered qualification system. For example, a particular line may need five level-1 workers, three level-2 workers and one level-3 worker. In one example, a level-3 worker may be qualified to do level-1 or level-2 tasks. In the example of multiple lines, it may be desirable to hold off assigning a level-3 worker to a level-1 or level-2 task if a level-1 or level-2 worker is expected to arrive within a reasonable and/or acceptable time frame.

The present invention may be further configured, in the case where a worker estimates his time of arrival, to compare the estimate to historical data accumulated about the particular worker. For example, if the worker estimates their arrival time will be ten minutes late and in the past the provided estimates were typically within a predetermined error (e.g., 5%), the present invention may rely on the estimate. However, if a particular worker often says they will be ten minutes late, but in fact arrives twenty or thirty minutes late (when they have previously reported being ten minutes late), the present invention may choose to not rely on the information. Reliability of time estimates would be particularly important if a decision was made to delay a first line, in favor of getting a first, second, third and fourth line operating sooner. In particular, it would be less than desirable to delay the first line, if the delayed worker or workers needed do not actually show up for work as estimated.

The present invention may also be useful in determining (e.g., tracking) which particular classifications of workers are generally in short supply. The present invention may generate reports that may be used to take a proactive steps in increasing the number of in-demand workers available. Additionally, reports may be generated to determine which workers are generally over-represented in the worker pool. If a particular class of workers generally has too many workers that do not get assigned to a line, inefficiencies such as over-payment of wages may result.

The present invention may be used to reduce such excessive manning.

Referring to FIG. 1, a flow diagram is shown illustrating a process 100 in accordance with a preferred embodiment of the present invention. The process 100 may comprise a state 102, a state 104, a state 106, a state 108, a state 110, a state 112, a state 114, a state 116, a state 118, a state 120, a state 122, a state 124, a state 126, a state 128 and a state 130. The state 102 may be implemented as an start state. The state 102 may be implemented as a start state. The state 104 may be implemented as an selection state. The state 106 may be implemented as a decision state. The state 108 may be implemented as a decision state. The state 110 may be implemented as a decision state. The state 112 may be implemented as a decision state. The state 114 may be implemented as a listing state. The state 116 may be implemented as a next employee selection state. The state 118 may be implemented as a sorting state. The state 120 may be implemented as a decision state. The state 122 may be implemented as a display state. The state 124 may be implemented as an automatic assignment state. The state 126 may be implemented as a manual assignment state. The state 128 may be implemented as a decision state. The state 130 may be implemented as an end state.

The process 100 generally begins in the state 102 and moves to the state 104. In the state 104, the process 100 may determine which tasks (or positions) are to be assigned and prepares to perform an iterative process for making the assignments. When the tasks have been determined, the process 100 selects one of the tasks (e.g., a current task) and a first employee from an employee list. When the current task and first employee have been selected, the process 100 moves to the state 106. In the state 106, the process 100 may query an employee database 132 and determine whether the selected employee is qualified (or trained) to perform the current (or selected) task. When the selected employee is not qualified, the process 100 moves to the state 108 to select another employee. When the selected employee is qualified, the process 100 moves to the state 110.

In the state 110, the process 100 determines whether the selected employee is present (e.g., in attendance, soon to arrive, etc.) at the work place. For example, the process 100 may make queries about which employees are present (or available) through an attendance monitoring interface 134. When the selected employee is not present, the process 100 may move to the state 108 to select another employee. When the selected employee is present, the process 100 may move to the state 112.

In the state 112, the process 100 may determine whether the selected employee has already been assigned to another task. When the selected employee has already been assigned, the process 100 may move to the state 108 to select another employee. When the selected employee has not been assigned to another task, the process 100 may move to the state 114. In the state 114, the process 100 may update a shortlist for the current task by adding the selected employee. When the shortlist is updated, the process 100 moves to the state 108 to select another employee.

In the state 108, the process 100 determines whether a last employee of the employee list has been reviewed. When the end of the employee list has not been reached, the process 100 moves to the state 116. In the state 116, the process 100 selects a next employee from the employee list and moves to the state 106. When the process 100 is in the state 108 and the end of the employee list has been reached, the process 100 may move to the state 118. In the state 118, the process 100 generally applies business criteria to sort and/or highlight the employee choices on the shortlist. When the process 100 has finished applying the business criteria, the process 100 may move to the state 120. In the state 120, the process 100 generally determines whether (i) an automatic assignment of employees is to be made or (ii) a manual assignment by a supervisor is to be performed. When a manual assignment is to be performed, the process 100 moves to the state 122. When an automatic assignment is to be performed, the process 100 moves to the state 124.

In the state 122, the process 100 displays the shortlist of employees for the current task along with other details to a supervisor. For example, the shortlist and other details may be displayed on a computer screen of the supervisor. When the shortlist of employees for the current task and other details have been displayed, the process 100 moves to the state 126. In the state 126, the process 100 allows the supervisor to make assignment decisions. When the supervisor has made the assignment decisions, the process 100 moves to the state 128.

When the process 100 is in the state 124, the process 100 automatically assigns an employee on the shortlist to the current task based on predetermined criteria. In one example, the predetermined criteria may be programmable. When the automatic assignment for the current task has been made, the process 100 moves to the state 128. In the state 128, the process 100 determines whether any further tasks remain to be assigned. When further tasks remain to be assigned, the process 100 may return to the state 104 to repeat the process for a next task. When no further tasks remain to be assigned, the process 100 may move to the state 130. In the state 130, the process 100 may end.

Figure 2:
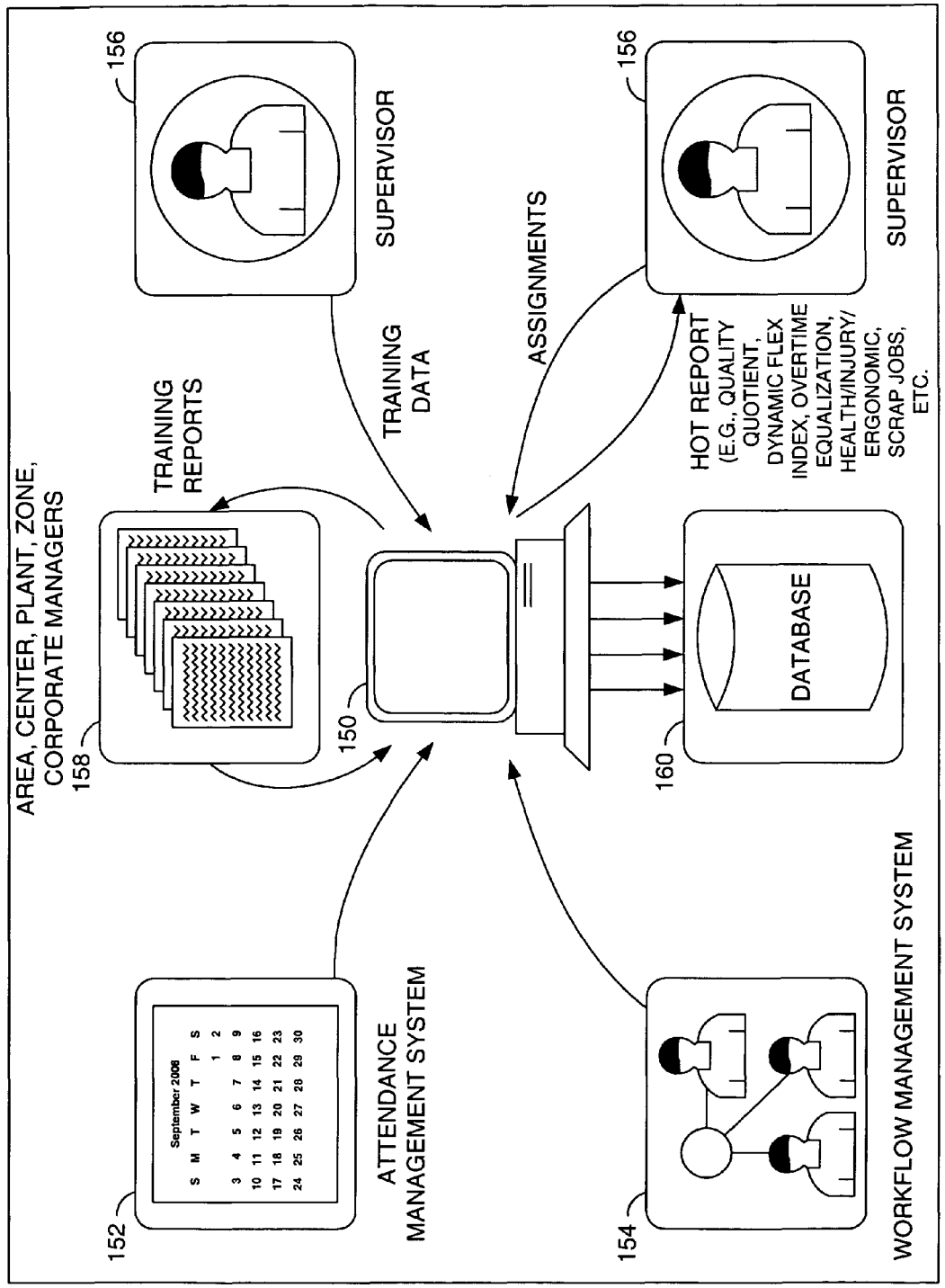
FIG. 2 is a diagram illustrating a system in accordance with the present invention.

Referring to FIG. 2, a diagram is shown illustrating a system 150 in accordance with a preferred embodiment of the present invention. In one example, the system 150 may be implemented in software (e.g., as a computer readable medium containing computer executable instructions, which, when executed by a computer, instruct the computer to perform a process in accordance with the present invention). In one example, the system 150 may be integrated with other system in a plant or plants (e.g., attendance tracking systems, job assignment systems, plant manufacturing information systems, etc.). In general, the system 150 may work in collaboration with the other systems in the plant or plants. For example, the system 150 may be configured to receive (or collect) information from (i) an attendance management system 152, (ii) a work flow management system 154, (iii) one or more supervisors 156 and/or (iv) one or more managers 158. The managers 158 may include area, center, zone, plant and/or corporate managers. In general, the system 150 may store, maintain and manipulate information in one or more databases 160.

In one example, the system 150 may be used periodically (e.g., daily, weekly, etc.) by the supervisors 158 to input and manage employee skills and training data. The system 150 may store the employee skills and training data in the database 160. In one example, the database 160 may be implemented as a centralized database. By providing a centralized database, the present invention allows updates to the database entered by a supervisor in one location to be available to other supervisors at the same location or at some other location.

The system 150 may comprise a pre-built interface for integrating the system 150 with the attendance management system 152. In one example, when employees (or operators) sign in to the plant at the beginning of a shift, information about the arrival of the worker may be communicated to the system 150 by an attendance tracking system. In one example, the information about worker arrivals may be transferred in real time. The information about worker arrivals may be stored in the data base 160.

The system 150 comprise another pre-built interface for integrating the system 150 with the work flow management system 154. In one example, the work flow management system 154 may comprise an operators job assignment system. When employees sign in to their respective stations or nodes at the start of a shift, information about their arrival at the station or node may be communicated by the operators job assignment system to the system 150. In one example, the information may be transferred in real time. In one example, the information may be stored in the database 160.

The system 150 may be further configured to generate (or present) reports for use by the supervisors 156 and/or managers 158. For example, the system 150 may be configured to generate hot reports (e.g., containing information about assignments, replacements, critical positions, absent stations, quality training, overtime equalization, etc.) and training reports to the supervisors 156 and/or the managers 158. In one example, a supervisor 156 may sign onto the system 150 before a shift begins. For example, the supervisor 156 may log on to the system 150 ten to fifteen minutes before the start of the shift.

The system 150 may be configured to present a number of hot reports to the supervisor 156. In one example, the hot reports may inform the supervisor about all stations that are unattended and replacement operators for each of the unattended stations. In one example, the hot report presented by the system 150 may present the replacements on a gradual scale of preference (e.g., direct, swap and critical). A direct replacement comprises assigning a trained and available operator to an unattended station. The direct replacement is generally the easiest and best replacement to make. The swap replacement assigns a trained and available operator to an unattended station by shuffling around some already assigned operators. The critical replacement is generally a last resort of the supervisor 156. A critical replacement generally assigns an untrained, but available, operator to an unattended station.

The supervisors 156 may use the hot reports to assign replacement operators to unattended stations to enable the shift to start without any startup loss. The system 150 may also provide proactive training management reports to senior managers 158. The proactive training management reports may help identify stations for which more operators should be trained, operators who may be cross trained, etc.

The system 150 may have a number of built in features that may enhance operational performance of a manufacturing environment. The system 150 be configured to provide a flex chart, a dynamic flex chart, man assignment reports, absent stations reports, quality quotient forecasts, automatic addition of training data, automated overtime equalization, etc. The flex chart may comprise a spreadsheet detailing the skills of employees. The flex chart may keep track of training of the operators at various stations in the plant or plants.

The dynamic flex chart may provide, for example, a status report of manpower availability, a report of training needs and a report on training updates. In one example, the dynamic flex chart may be implemented with a web based format the may allow supervisors and managers to monitor information in real time. In one example, the presence and/or absence of employees may be represented using symbols, colors or other appropriate techniques. For example, the presence or absence of an employee may be indicated by a green or red square, respectively, while an individual's skill level and additional skills (o training) may be indicated in a blue square. However, other visual devices may be implemented accordingly to meet the design criteria of a particular implementation.

The man assignment report may be configured to indicate each station and the assigned operators for respective operations on a shift. In one example, an option may be implemented to allow unassigning any operator from an assigned station/operation. The absent stations report may provide information about absent stations where regular operators did not report for a given shift. The absent station report may facilitate placing suitable operators in absent stations to minimize productivity loss.

The quality quotient forecast may provide a single metric that may be used to assess the risk of operation to quality based on the skill level of operator training, complexity of operation (e.g., learning factor), severity of operation as it relates to safety, quality and customer satisfaction. In one example, the quality quotient forecast may highlight areas, zones teams, and/or stations in a particular color (e.g., red) where the quality quotient is below a predetermined acceptable threshold level. The quality quotient may help supervisors to focus efforts for improvement. For example, stations with a quality quotient below 40% may be focus areas to be improved, have operators redeployed or validation increased.

The system 150 may facilitate supervisors to automatically add a training record for operators getting trained on new stations. The automatic update may be performed on an ongoing basis with little or no data input.

The automated overtime equalization may provide for automated processing of overtime tracking, overtime distribution and effective discrepancies management. In one example, the system 150 may assist the supervisors 156 to manage overtime equalization on a local level. The automated overtime equalization feature of the system 150 may be customizable to reflect local agreements, distribution procedures and sequence.

The present invention may be configured to work in collaboration with the other systems already in operation at the plant or plants. The present invention generally provides a platform-independent application that may embrace any technology used, for example, by vehicle and supplier OEMs. The present invention also provides an open ended system, enabling data to be imported from any customer database.

In one example, the present invention may be implemented using Java, Struts, Web Services, WebSphere, UDQ, Oracle and/or any other database access languages or relational database management systems (RDBS). The present invention generally provides a platform-independent and database-independent application that can embrace any technology used by vehicle and supplier OEMs. In one example, pre-built interfaces (e.g., based on the Web Services technology) may be provided to integrate the system 150 with other systems at the plant for collaboration and exchange of data. For example, the pre-built interfaces may be linked to the shop's attendance and station log-in systems and configured to work in collaboration with these systems. By providing a platform-independent multi-user system, the present invention may be deployed and integrated with the other systems in the plant in a minimal amount of time.

The system 150 may be configured to cover all plants in a manufacturing and/or supplier operation. The system 150 may provide a flexible hierarchy for supporting multiple plants and/or multiple structure levels. The system 150 may support multi-national corporations by providing support for generating reports in multiple languages. For example, reports may be generated in a respective language of the supervisors and/or managers being sent the reports. The present invention may also support a mobile management architecture by communicating information (e.g., reports, etc.) via a local area networks (LAN), wide area networks (e.g., the internet), cellular and/or telephone networks, and any other appropriate networks. The system 150 may also be configured to handle impulse demand.

The present invention may be configured to process skills needed at the unattended stations and match the skills with the available replacement operators to determine instantaneously the most qualified operators for those unattended stations. The present invention generally allows supervisors to reduce startup/throughput loss on the shop floor. By managing the skill sets of all the workers and by insuring immediate and optimal assignment of the most qualified operators to unattended stations, the present invention may dramatically improve the efficiency of supervisors and reduce product defects and rework. Safety, quality, delivery, cost, and morale (SQDCM) may be improved across the board.

The present invention generally maintains a skills/training database of both assigned and temporary operators. The present invention may also capture and track pilot phase training records (e.g., an invaluable tool to insure a smooth transition from pilot program to production). The present invention generally provides the plant management with features to proactively identify the training needs of one or more employees, and also to proactively identify the training needs of one or more stations (or tasks).

Figure 3:
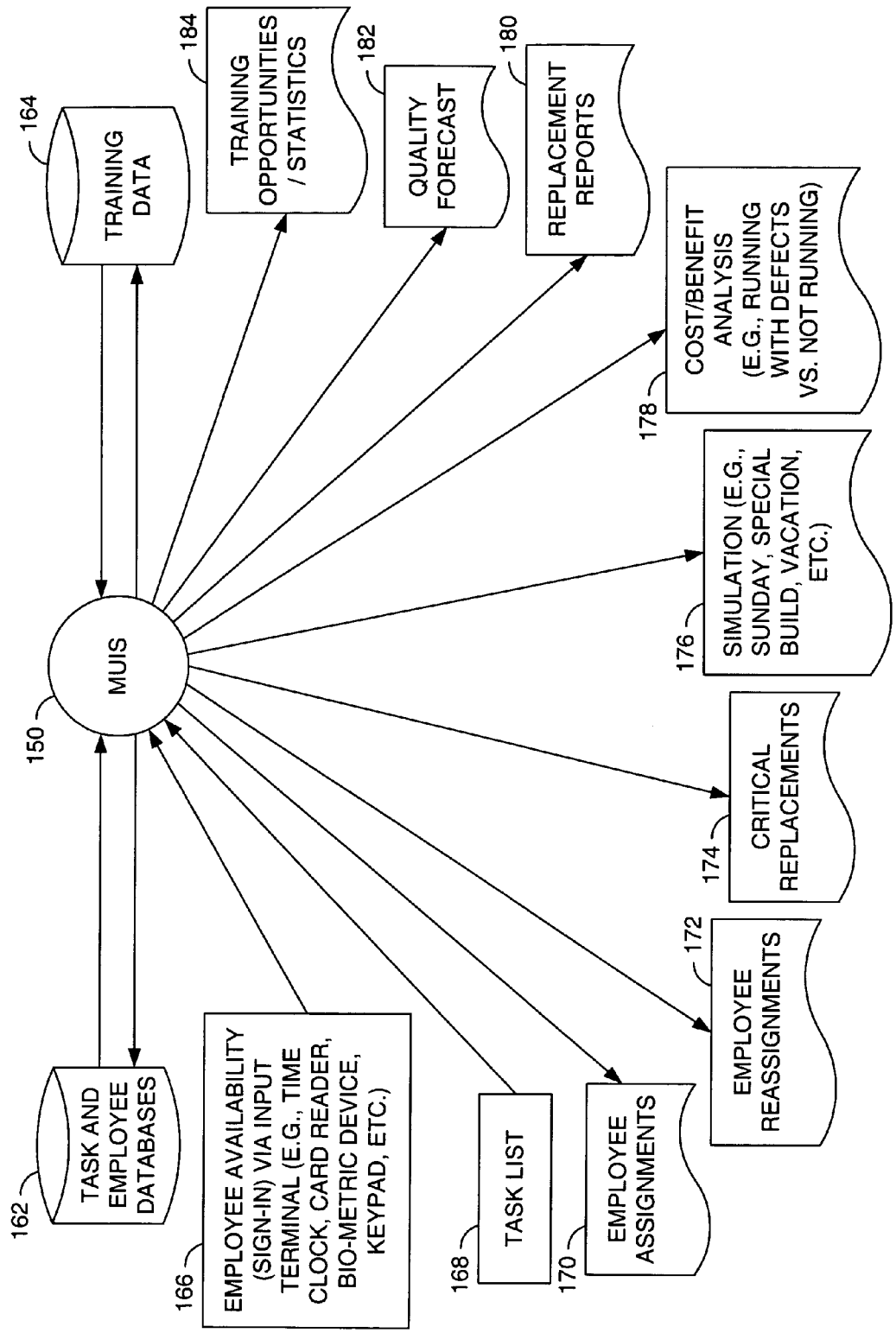
FIG. 3 is a block diagram illustrating logical data flows in accordance with the present invention.

Referring to FIG. 3, a detailed block diagram illustrating logical data flows in accordance with the present invention is shown. In one example, the system 150 may be configured to maintain, manipulate, update, and/or utilize data in one or more databases (e.g., task and employee databases 162, training data databases 164, etc.). The system 150 may be configured to receive employee availability (e.g., estimated arrival time, actual arrival, etc.) information 166 (e.g., via input terminal, time clock, card reader, biometric device, keypad, cell phone, PDA, etc.) and a task list 168. The task list 168 may include job availability. The process 150 may be configured to generate employee assignment reports 170, employee re-assignment reports 172, critical replacement reports 174, simulation reports 176 (e.g., Sunday, special build, vacation, etc.), cost benefit analysis reports 178 (e.g., running with defects versus not running), replacement reports 180, quality forecasts 182 and training opportunity and statistic reports 184. In one example, the task and employee databases 162 and the training data databases 164 may be maintained (e.g., updated, etc.) using the system 150 or one or more external systems.

The process 150 may be configured to generate employee assignment reports 170 providing information about, for example, critical operations, direct replacements made, swap replacements made, critical replacements made and training opportunities. In one example, the assignment reports 170 may include station or position information, a description of the task of the position, a name and employee number of the employee assigned to a task, information about the skill level of the employee, contact information and any other information that may be useful to supervisors and/or managers.

The employee reassignment reports 172 may comprise information regarding reassignment (or swapping) of employee placement. With respect to swap replacements, the report may provide information (e.g., name, employee number, etc.) about an unassigned employee moved to a task from which a previous assigned employee was moved (swapped) to another task. With respect to critical replacements, the report may provide information about the station, description of the operation and a selection of operators that may be used to fill the position. With respect to training opportunities, the report may list the station or stations and a description of the tasks performed at each station that may benefit from additional trained employees.

The critical replacement reports 174 may be generated for one or more zones. Each of the reports 174 may cover the current day or a range of days. In general, the reports 174 may include the data the replacement was made, the zone in which the replacement was made, the station number at which the replacement was made, the type of operation involved and the employee used in the replacement.

The system 150 may be configured to generate simulation reports 176, cost/benefit analysis reports 178 and quality forecast reports 182 using a forecasting tool. In one example, the system 150 may be configured to generate simulations of Sunday and special builds based on a quality quotient (QQ). In another example, the system 150 may be configured to assess a risk or risks of part or all of the operation on quality. The system 150 may be further configured to forecast the effect of employee vacations on quality.

In one example, the system 150 may implement the quality quotient (QQ) or a flex index as a single metric that may be used to assess the risk of operation to quality based upon the skill level of operator training. For example, parameters such as level of training, learning factor of operation (e.g., cycles) and severity (or criticality) of operation (e.g., impact to quality) may be combined to determine the quality quotient or flex index. However, other parameters may be implemented accordingly to meet the design criteria of a particular implementation.

In one example, the parameters used to determine the quality quotient may be weighted for forecasting. For example, the Level of Training may be assigned a weight of 50%, the Learning Factor may be assigned a weight of 30% and the Severity may be assigned a weight of 20%. However, other weights may be selected to meet the design criteria of a particular implementation. In one example, the quality quotient or flex index may be determined according to an equation similar to the following equation:

$$QQ = (LevelofTraining*W1)*((LearningFactor*W2) + (Severity*W3)),$$

where W1, W2 and W3 represent weighting factors. In one example, a number of values for each of the parameters (e.g., with or without weighting) may be tabulated as illustrated in the following TABLE 1:

TABLE 1

|  | Level of Training | | | |
|---|---|---|---|---|
|  | A | B | C | D |
|  | 0.5 | 1.0 | 1.5 | 2.0 |
| Learning Factor (cycles) | 200 | 600 | 1800 | 2500 |
|  | 0.2 | 0.15 | 0.10 | 0.05 |
| Severity of operation (Impact on Quality) | L1 | L5 | L10 | L20 |
|  | 0.3 | 0.22 | 0.15 | 0.08 |

Using example values for the parameters from TABLE 1 above, the following example results may be obtained:

Best QQ=2.0 (0.20+0.30)=1=100%
Worst QQ=0.5 (0.08+0.05)=0.06=6%

Other examples may include:

QQ=1.5 (0.15+0.22)=0.55=55%
QQ=0.5 (0.10+0.15)=0.25=25%

The reports generated may show actual QQ or Flex Index values for a team, zone, area, center, plant and/or plants. The QQ or Flex Index may be generated for every shift. The QQ or Flex Index generated may be used to assess how the skill versatility affects quality.

The system 150 may be configured to generate replacement reports 180 summarizing replacements performed. In one example, the reports 180 containing information about replacements made may be generated for one or more stations. The reports 180 may include information for a current day or for a range of days. In one example, the reports 180 may include a list of replacements performed, organized by date, station number, type of operation performed and/or employee used to make the replacement.

In another example, the process system 150 may be configured to generate a doubling up replacement report. Doubling up generally refers to a process in which two employees are assigned for a single job. Doubling up may be used for the purpose of training or where an employee is not available with a sufficient level of skill. Doubling up enables less skilled employees to be trained for the particular skills of a particular station. Similar to the replacement reports 180 the doubling up replacement report may be generated for one or more stations and/or zones and the current day and/or a range of days. The doubling up replacement report may include the date the replacement was made, the zone in which the replacement was made, the station at which the replacement was made, the operation involved and the employees assigned.

The training opportunity and statistics reports 184 may be generated for one or more stations of a particular task. In one example, a training opportunity and statistics reports 184 may be generated containing data over a range of dates. The system 150 may be configured to generate training opportunity and statistics reports 184 customized for (i) replacements done, (ii) doubling up replacements done, (iii) critical replacements done and/or (iv) operator training validity. The training opportunities and statistics reports 184 generally comprise a list of information that may be organized according to zone, station, type of operation and number of occurrences for each particular type of replacement.

The system 150 may also be configured to allow management of the databases 160 and 162. In one example, the system 150 may be configured to allow selection of data regarding particular stations, zones and areas. The system 150 may be further configured to allow management of employee training data. For example, the system 150 may allow a supervisor or manager to call up (retrieve) employee records from the various databases based upon particular operations. In one example, the manager may enter a particular operation in which employee training data is to be manipulated. The system 150 in response to the request from the manager may present a list of employees (e.g., by employee id, first name, last name and skill level) for the particular operation or operations selected.

Besides allowing managers to generate lists of employees according to associated training capabilities, managers may also be able to add employee training data to the databases via the system 150. In one example, an employee record may be retrieved by using the employee id number or the employee name. Once the record has been pulled up, the manager may make changes to a number of fields containing information about the employees capabilities. For example, an employee record may include information concerning by a particular sensor, particular area, particular zone, particular station, particular operations, skill levels and the date in which the displayed information is valid.

Similarly, the system 150 may allow managers to call up employee training histories (e.g., by employee number or employee name). In one example, the manager may be able to generate a report illustrating employee training history over a selected range of dates. For example, the manager may select a range of dates and the system 150 may generate an employee training history report containing information about stations, zones, types of operations, skill levels for each of the operations and the dates on which the training was obtained or to which the training is considered current. In another example, the system 150 may be configured to generate an employee training flex chart. The flex chart may be generated based on the employee id or employee name based on a station operation and/or skill or based on the center area, the zone station operation and/or skill.

Figure 4:
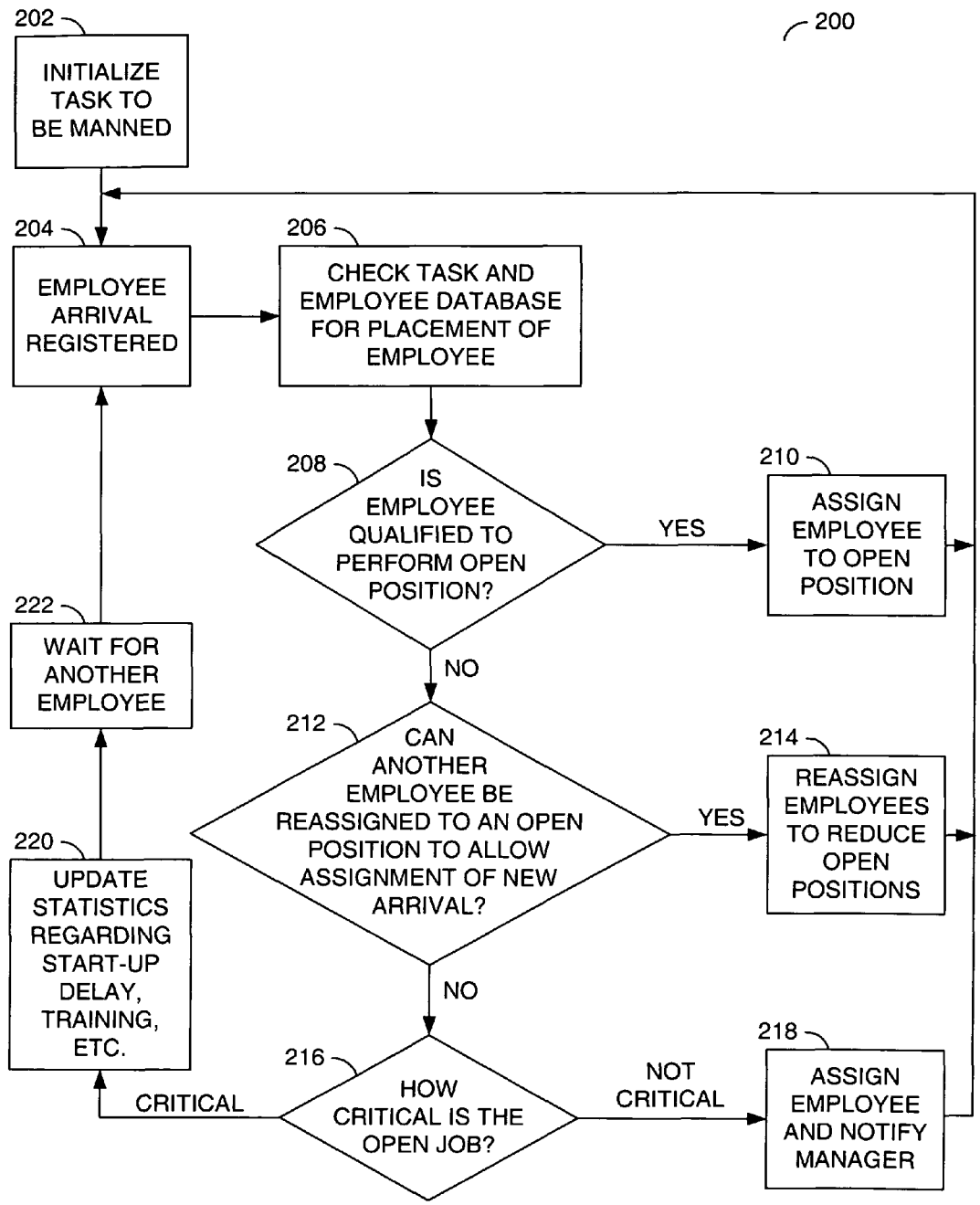
FIG. 4 is a flow diagram illustrating an automatic assignment procedure in accordance with the present invention.

Referring to FIG. 4, a flow diagram is shown illustrating an automatic assignment procedure 200 in accordance with a preferred embodiment of the present invention. In one example, the process 200 may comprise a state 202, a state 204, a state 206, a state 208, a state 210, a state 212, a state 214, a state 216, a state 218, a state 220 and a state 222. The state 202 may be implemented as an initialization state. The state 204 may be implemented as an employee arrival detection state. The state 206 may be implemented as a data base examination step. The state 208 may be implemented as a decision state. The state 210 may be implemented as an assignment state. The state 212 may be implemented as a decision state. The state 214 may be implemented as an assignment state. The state 216 may be implemented as a decision state. The state 218 may be implemented as an assignment state. The state 220 may be implemented as an update state. The state 222 may be implemented as a wait state.

Upon starting the process 200, the process 200 enters the state 202. In the state 202, the process 200 generally initializes the task (or tasks) to be manned. For example, the process 200 may determine which particular processes (e.g., lines, etc.) are to be manned. When the task to be manned has been initialized, the process 200 generally moves to the state 204. In the state 204, the process 200 may be configured to wait until an employee arrival is registered. Upon registration of an employee arrival, the process 200 may move to the state 206. In the state 206, the process 200 may be configured to check a task and employee database to determine an appropriate placement for the employee who just arrived. For example, the process 200 may retrieve information regarding the particular task to be manned and the training background for the employee who has arrived. Upon retrieving the information regarding the task and the employee from the database, the process 200 may move to the state 208.

In the state 208, the process 200 may determine whether the employee is qualified to perform an open position in the task to be manned. If the employee is qualified for an open position, the process 200 may move to the state 210. If the employee is not qualified to perform an open position, the process 200 may move to the state 212. In the state 210, the process 200 may assign the employee to the open position and return to the state 204 to await further employee arrivals.

When the process 200 is in the state 212, the process 200 generally determines whether another employee may be reassigned to an open position to allow assignment of a newly arrived employee. If a switch between employee assignments is acceptable, the process 200 may move to the state 214. If the switch is not acceptable, the process 200 may move to the state 216. In the state 214, the process 200 generally reassigns employees to fill open positions and returns to the state 204 to await further employee arrivals. If the employee who arrived cannot fill the open positions and cannot be switched with another employee already assigned to a position, the process 200 generally moves to the state 216.

In the state 216, the process 200 generally determines how critical the open job is to the overall quality and efficiency of the operation. When the open job is not critical, the process 200 generally moves to the state 218. When the open job is critical to the overall process, the process 200 generally moves to the state 220. In the state 218, the process 200 may assign an employee who just arrived to the open job and notify a manager or supervisor that the assignment of a person not qualified for the job has been made. In the state 220, the process 200 may perform a procedure to update statistics regarding startup delay, training needs, and other predetermined parameters. The process 200 may then return to the state 204 to wait for another employee to arrive.

The present invention targets the serious absenteeism and skills/training problems prevalent in the manufacturing environment. The present invention generally provides a tool (or tools) to improve efficiency and lower manufacturing costs while effectively raising quality. There is an average 11% absenteeism in vehicle OEM plants in North America, and similarly significant but varying degrees (e.g., 4-9%) of absenteeism across the supplier ranks. There are numerous factors which contribute to absenteeism. While it is difficult and perhaps unrealistic to expect easy answers to reducing actual absenteeism, the present invention generally provides unique and innovative software solutions that may be extremely beneficial in minimizing negative start up, productivity and quality effects of absenteeism.

The negative effects of absenteeism are fairly straightforward. For example, with absenteeism as high as 7% to 11% each day (reportedly higher than 11% during summer) at vehicle OEM assembly operations, the plant generally needs to employ a significant-sized 'temporary' pool of fill-in operators in order to maintain smooth line operations. At the vehicle OEMs, for example, industry sources quote that productivity and financial losses due to absenteeism range from about $10 million to as high as $40 million per typical assembly plant.

Whether for a supplier or a vehicle OEM operation, managing the skill set needs of the temporary pool can be difficult. The difficulty in managing the skill set needs may lead to redundancy and over-manning within the pool. Quality issues also may surface as 'temporary' workers with less than optimal skill sets are force-fed into positions. Add to this the pressure on shop floor supervisors to deal day to day with the changing mix of new and absent employees and the respective skill sets, as well as the overall complexities in keeping accurate track of training levels and records, and the scope of the issue becomes apparent.

The inability to efficiently match the right operator with the right job carries a significant price tag beyond the cost of the extra headcount. For example, the cost of defective product can be detrimental regardless of whether the defective product is caught and scrapped in the plant, or reaches the hands of customers leading to warranty and loyalty issues. About 20% of early warranty returns are due to improper assembly and adjustment. At the vehicle OEMs, for example, productivity and financial losses due to absenteeism range from about $8 million to as high as $14 million per typical assembly plant, and this is before considering the serious cost of reduced customer satisfaction and loyalty. For example, the cost per year for every 1 percentage point change in the rate of absenteeism can range from $60 million to $125 million.

The present invention generally allows the shop floor supervisor to quickly and easily identify the right operator for the right job at the right moment. The system generally does not rely on personal memory. Given the not infrequent changes/absences among the supervision as well as operator ranks, the present invention generally provides an advantage over reliance on a particular supervisor. The present invention, along with enabling supervisors to quickly identify the best available operator and place him in the job, also tracks the skills status and training level needs of new and existing employees.

A major tangible benefit of the present invention is the reduction of the size of the 'temporary' pool of operators needed to fill positions due to absenteeism on the shop floor. Other benefits may include (i) improved productivity and line efficiency (e.g., reduced line efficiency loss and downtime), (ii) improved product quality (e.g., fewer defects), (iii) reduced repair/rework, scrap and start-up loss, (iv) improved launch and production readiness, (v) improved line supervisor efficiency, (vi) more effective management of operators, including efficient identification of areas for improvement and training, (vii) strengthened team morale, (viii) improved operations flexibility to accommodate future change and (ix) custom reports tracking manpower, skills, training, and absenteeism/attendance issues. No less significant, is a reduction in the startup loss at a plant through optimization and management of the mix of skill sets in the pool (and on the production line).

The function performed by the present invention may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for optimizing a workforce by executing a computer program configured to cause a computer to perform a process comprising the steps of:
   (A) querying one or more databases, said one or more databases storing, in a non-transitory computer readable medium, information related to a plurality of workers, to determine a first set of workers, each worker in said first set of workers being qualified to perform at least one task from a set of predetermined tasks associated with operation of a production line at a particular time to produce a product;
   (B) querying said one or more databases to determine a second set of workers that are available to work on said production line at said particular time, wherein determining the second set of workers includes determining whether a worker will be present at said particular time using an expected arrival time for said worker to arrive at a location where a particular task is to be performed based upon an estimate called in by said worker and historical data regarding accuracy of previous estimates from said worker;
   (C) querying said one or more databases to determine a third set of workers that have not already been assigned to a task at said particular time;
   (D) determining, by the computer, a fourth set of workers to perform said set of predetermined tasks associated with operation of said production line at said particular time by selecting workers belonging to said first set, said second set, and said third set;
   (E) assigning, by the computer, each worker in said fourth set of workers to a respective position on said production line associated with one of said tasks in said set of predetermined tasks associated with operation of said production line, wherein (i) in a first mode, said fourth set of workers are automatically assigned to the respective positions, taking into account said expected arrival times of one or more workers to minimize a total delay associated with starting up said production line by avoiding assignment of a high-skill worker to a low skill job when a low-skill worker is expected to be present, (ii) in a second mode, a report is displayed to a supervisor and the supervisor assigns each worker to the respective position, and (iii) one or more workers can be re-assigned to different positions and associated tasks on said production line during performance of the associated tasks in order to improve a match between skills of said one or more workers and the tasks associated with the one or more positions; and
   (F) generating one or more reports for presentation to the supervisor or a manager, said one or more reports containing information about one or more of assignments, replacements, critical positions, absent stations, quality training, overtime equalization, identification of one or more of stations for which more operators should be trained, and operators who could be cross trained.

2. The method according to claim 1, wherein steps (A), (B) and (C) are performed simultaneously.

3. The method according to claim 1, wherein said particular time comprises a particular shift at a factory or manufacturing facility at which said production line is located.

4. The method according to claim 3, wherein step (B) comprises determining availability of said second set of workers a predetermined amount of time before a start of said particular shift.

5. The method according to claim 4, wherein said predetermined amount of time is between 1 and 30 minutes.

6. A non-transitory computer readable medium storing computer readable instructions that when executed cause a computer to execute the steps of claim 1.

7. The method according to claim 1, wherein the process further comprises the step of:
   (G) re-assigning at least one worker from a particular station along said production line to which the worker is assigned to another station along said production line as additional workers become available based upon predetermined qualifications of said additional workers and one or more predetermined parameters of said set of predetermined tasks, wherein said at least one worker is re-assigned prior to or during performance of the task associated with the particular station and a number of open positions associated with said production line is reduced.

8. A non-transitory computer readable medium having computer executable instructions for causing a computer to execute a method for managing a work force comprising the steps of:
   determining workers available to perform a plurality of predetermined tasks associated with a plurality of stations of a production line, wherein determining whether a worker is available includes determining whether a worker will be present at a particular time using an expected arrival time for said worker to arrive at a location where a particular task is to be performed based upon an estimate called in by said worker and historical data regarding accuracy of previous estimates from said worker;
   automatically assigning each worker who is available to a particular station of said production line based on predetermined qualifications of each worker and one or more predetermined parameters of said plurality of predetermined tasks, wherein said expected arrival time of one or more workers is taken into account to minimize a total delay associated with starting up said production line by avoiding assignment of a high-skill worker to a low skill job when a low-skill worker is expected to be present; and
   automatically re-assigning at least one worker from the particular station to which the worker is assigned to another of said plurality of stations as additional workers become available based upon said predetermined qualifications of said at least one worker and said one or more predetermined parameters of the tasks associated with the other stations, wherein said at least one worker is re-assigned prior to or during performance of the task associated with the particular station.

9. The computer readable medium according to claim 8, further comprising a database containing said predetermined qualifications of each of said workers, wherein said predetermined qualifications comprise at least three worker skill levels, a level-3 worker is qualified to do level-1 and level-2 tasks, a level-2 worker is qualified to do level-1 tasks, and assignment of a level-3 worker to a level-1 or level-2 task is delayed if a level-1 or level-2 worker is expected to arrive at a location of said production line within a predetermined time frame based upon said expected arrival time for said level-1 or level-2 worker determined using an estimate called in by said level-1 or level-2 worker.

10. The computer readable medium according to claim 8, wherein said one or more predetermined parameters comprise safety, quality, cost, deliver, morale, defects, repairs, warranty, start-up loss, efficiency loss, productivity, scrap, rework and overmanning.

11. The computer readable medium according to claim 8, further comprising instructions for executing the step of:
   operating a remote input device configured to identify workers upon arrival of the workers at a location where said task is to be performed.

12. The computer readable medium according to claim 11, wherein said remote input device is selected from the group consisting of a magnetic card reader, a bio-metric input device, a keyboard, a keypad, and a bar code reader.

13. The computer readable medium according to claim 8, further comprising instructions for executing the step of:
   generating reports on assignments and reassignments.

14. The computer readable medium according to claim 8, further comprising instructions for executing the step of:
   generating reports identifying one or more of stations for which more operators should be trained and operators who could be cross trained.

15. The computer readable medium according to claim 8, further comprising instructions for executing the steps of:
   simulating manning decision outcomes; and
   generating forecasts using a forecasting tool, wherein said forecasts predict one or more of quality, flexibility and risk of operation based upon the simulated decisions.

16. The computer readable medium according to claim 8, wherein the step of determining available workers comprises registering an arrival of an employee at a location of a production line for producing a product and the step of automatically assigning each available worker comprises:
   checking task and employee databases for placement of the employee whose arrival is registered;
   determining whether the employee whose arrival is registered is qualified to perform a predetermined task associated with an open position of said production line;
   if the employee whose arrival is registered is qualified, assigning the employee whose arrival is registered to the open position of said production line; and
   if the employee whose arrival is registered is not qualified, determining whether a previously assigned employee can be reassigned to the open position or another position of said production line to allow assignment of the employee whose arrival is registered.

17. The computer readable medium according to claim 16, wherein the step of automatically reassigning workers as additional workers arrive comprises:
   determining whether another employee can be reassigned from a currently assigned position to an open position to allow assignment of the employee whose arrival is registered, wherein the other employee is re-assigned prior to or during performance of the task associated with the currently assigned position;
   if another employee can be reassigned, assigning the employee whose arrival is registered to the currently assigned position and reassigning the other employee to another position such that the number of open positions is reduced;
   if another employee cannot be reassigned, determining an impact of the open position on quality and efficiency of an operation of said production line;
   if the open position will not have an impact on the quality and efficiency of the operation of said production line, assigning the employee whose arrival was registered to the open position and notifying a manager about the assignment; and
   if the open position will have an impact on the quality and efficiency of the operation of said production line, waiting for another employee to arrive.

18. The computer readable medium according to claim 17, wherein the step of automatically reassigning workers as additional workers arrive further comprises:
   updating statistics including start-up delay and training.

19. The method according to claim 1, wherein calling in said estimate by said worker is implemented using one or more of a cellular telephone, a pager, a global positioning system (GPS) device, and electronic mail.

* * * * *